Oct. 11, 1938. J. M. GWINN, JR 2,133,168
RESILIENT CONTROL MEANS
Filed Feb. 10, 1937
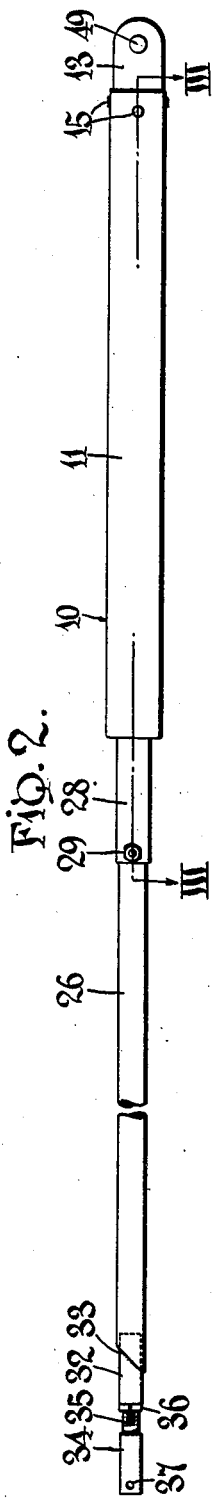
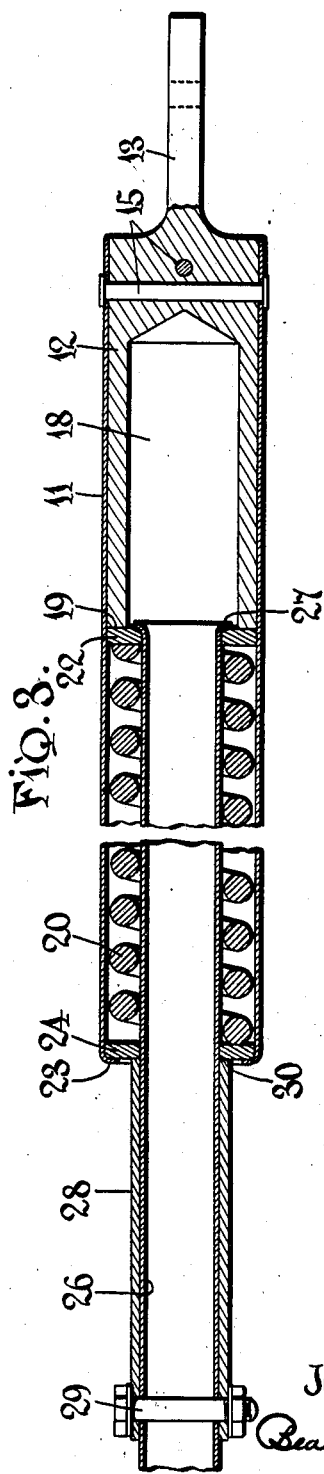
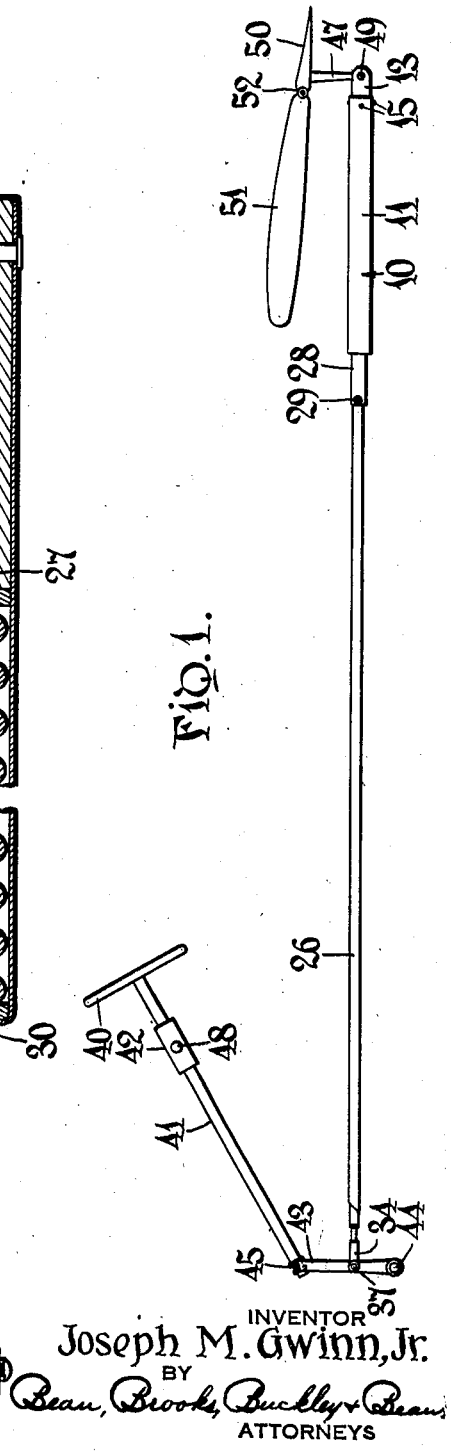
INVENTOR
Joseph M. Gwinn, Jr.
BY
Bean, Brooks, Buckley & Bean
ATTORNEYS Patented Oct. 11, 1938

2,133,168

UNITED STATES PATENT OFFICE 2,133,168

RESILIENT CONTROL MEANS

Joseph M. Gwinn, Jr., Buffalo, N. Y.

Application February 10, 1937, Serial No. 125,100

14 Claims. (Cl. 244—83)

This invention relates to aircraft and more particularly to means for actuating movable surfaces provided for controlling the direction and attitude of the flight thereof.

Possible errors in judgment on the part of an aircraft pilot may include improper manipulation of control surfaces when changing the path of flight from an established course. Since the air force which develops against an air-deflecting surface increases as the square of the relative wind velocity, assuming that the velocity is at least sufficient to provide steerage way, the extent of control manipulation needed to accomplish a desired degree of deviation from the original course varies greatly with the speed of the craft relative to the air through which it is moving.

When the attempted maneuver is in relation to certain limits of ground space the proper manipulation of the controls becomes more complicated and depends upon a combination of the factors of relative air speed and relative ground speed. The range through which a pilot is required to move his control instruments to negotiate a desired maneuver therefor varies with different flight conditions, as distinguished from being a constant value as in the case of land vehicles which operate under positive traction conditions.

While flying at high speeds another factor appears that must be given due consideration. That is, the loads imposed upon the various members of an aircraft structure during deviation from an established course vary with the air speed of the craft and the degree of such deviations, and must be kept within certain limits to prevent structural failures.

Thus, the proper guidance of aircraft has heretofore involved both knowledge and judgment of high order, and long periods of training and experience as well as a natural aptitude have been necessary to enable a person to pilot an airplane with safety. This prerequisite has been a major factor in the limited development of aviation from the standpoint of the average person becoming an owner-pilot.

It is an object of the invention to provide an improved flight control mechanism for aircraft that will protect the craft from the imposition of improper conditions of flight and/or dangerous loads upon its structural members.

It is another object of the present invention to provide a flight control mechanism for aircraft that will accurately transmit control motions which are applied to the piloted end of the mechanism to flight controlling surfaces whenever said control motions are of aerodynamically proper degree, and automatically compensate for errors of judgment on the part of the operator by absorbing excessive portions of pilot control motions, and transmit to the flight controlling surface only those degrees of movement that are proper in view of flight conditions existing at any given time.

It is another object of the invention to provide a flight control mechanism for aircraft that will enable the pilot to manipulate a control operating member with regard to direction of movement only, and without precise regard to the degree or extent of such movement, without subjecting the craft to improper flight conditions or dangerous structural loads.

It is another object of the invention to provide an improved limited force transmitting unit in operating mechanisms for aircraft flight controlling surfaces such as aerofoils of the elevator, aileron, wing flap, or rudder type; whereby the operator is prevented from "over controlling" or applying to the surface a degree of manipulation that would be excessive in view of certain requirements for the structural safety of the craft.

Another object of the invention is the provision of an improved simple compact unit which may be connected into a push-pull control line as by replacing a portion of the usual control rod to absorb any predetermined excess controlling movements which the operator may attempt to impose upon a flight controlling surface of the aircraft through the control line in either direction of movement.

Another object of the invention is the provision of an improved simple self contained unit which is readily adapted to be connected in a control line for aircraft without extra support to automatically absorb excessive movements of the piloted end of the control mechanism and transmit movements to the aircraft controlling surface that are limited in extent to those that are proper in view of the air loads that are developed against the controlling surface when it is turned out of neutral position, under all relative wind velocity conditions.

In practicing the invention there is provided a control means incorporating a unit which is yieldable as a result of the application of opposed longitudinal forces at its ends whenever such forces exceed a predetermined maximum magnitude. In one form the yieldable unit may comprise a simple resilient means so arranged that it opposes relative movements of the ends of the unit under predetermined limited forces and thus provides for accurate transmission of control movements imposed upon the system by the pilot as long as they do not develop air pressure reactions on the controlled surface in excess of the limits for a safe maneuver. Any greater forces, in either direction, will be unopposed to automatically allow relative movements of the ends of the unit, and thus, only those pilot control movements that are of proper values will be transmitted through the unit to the movable surface at the opposite end of the control line.

In the drawing which illustrates only one exemplification of the invention:

Fig. 1 is a diagrammatic side elevation of an aircraft flight control mechanism constructed according to the principals of the invention;

Fig. 2 is a side elevation, on a larger scale, of a force transmitting unit included in the structure shown in Fig. 1; and Fig. 3 is a fragmentary longitudinal section on a larger scale, taken substantially along the line III—III of Fig. 1.

Referring to the drawing, 10 designates generally a limited force transmitting unit made in accordance with the invention. An outer tube member 11, of substantially uniform diameter throughout its length, is provided at its outer end with a plug or bushing 12 which is formed with an outwardly extending arm 13. Bolts 15 secure the plug 12 in fixed relation to the tube 11. The inner end of plug 12 is centrally socketed, as indicated at 18, in such manner as to provide a substantial annular shoulder 19 at its remote inner end. An open coil spring 20 is positioned axially within tube 11 having one of its ends seated against a ring 22 which slidably fits within the tube and bears against the shoulder 19 of the plug 12. At its remote inner end the tube 11 is formed with an inturned flange 23 to provide a bearing for a ring 24 which slidably fits within the tube and forms a seat for the opposite end of the spring 20.

An inner tube or rod 26, having one end portion positioned within the spring 20 and within the rings 22 and 24 in slide-fitting relation, is provided at its remote inner end with an outturned flange 27 for bearing against the outer face of ring 22, thus providing a stop for preventing relative movement of the ring 22 beyond the end of tube 26. A collar 28 is mounted on and over the exterior of tube 26, and is fixedly mounted thereon as by means of a bolt 29. The end 30 of the collar 28 is adapted to bear against the outer face of the ring 24 and thus provides a stop to limit the movement of the ring 24 along the tube 26 toward its outer end.

The remote outer end of tube 26 is provided with an internally threaded bushing 32 mounted in the end of the tube 26 by welding as at 33, or by some other suitable means. A clevis bolt 34 having a threaded shank 35 is screwed into the bushing 32 and may be locked therein at any desired position of adjustment by means of a lock nut 36. To assemble this portion of the mechanism, the ring 24, the spring 20, and the ring 22, in order, are first inserted in the tube 11 through the end of the tube which later houses the bushing 12. The tube 26 is then inserted from the same direction through the rings 22 and 24 and the spring 20 into such position that the flange 27 abuts the ring 22. The bushing 12 is then inserted in the outer end of tube 11 and pressed into the tube against the washer 22 and the action of spring 20 to the position shown in Fig. 2, where it is locked in place by means of the bolts 15. The collar 28 is then slipped on and over tube 26 to a position abutting the ring 24, as shown in Fig. 2, and is locked thereon by means of the bolt 29.

A control member of any conventional type, such as for example a control wheel 40 mounted upon a column 41 (Fig. 1) is provided for operation by the pilot. The column 41 is supported in slide fitting relation adjacent its upper end by a sleeve 42 which is pivotally mounted on the aircraft frame as by means of transversely extending pins 48. At its lower end the column 41 is pivotally connected as at 45 to one end of a lever 43 which is fulcrumed at 44, and the lever 43 is pivotally connected at an intermediate point 37 to the clevis 34. Thus, a fore and aft rocking motion of the wheel 40 about the fulcrum point 44 produces a corresponding longitudinal motion of the tube 26. The arm 13 at the opposite end of the unit 10 has a pivotal connection 49 to the lower end of a horn 47 which extends rigidly from the movable surface 50 which is hingedly mounted at 52 to a stationary aerofoil 51.

The various parts of the unit are so proportioned that when assembled, as shown in Fig. 3, the spring 20 is being held under compression between the rings 22 and 24. Thus, it is evident that compression loads, when applied to the remote ends of the unit will urge the tubes 11 and 26 toward a deeper telescopic relation, and the collar 28 will urge the ring 24 against the spring 20 and the bushing 12 will urge the ring 22 against the opposite end of the spring. When tensional loads are applied to the ends of the unit the flange 23 on tube 11 will urge the ring 24 against the spring 20 and the flange 27 at the inner end of tube 26 will urge the ring 22 against the opposite end of the spring. Thus, either compression or tensional forces when applied at the ends of the unit, will be opposed by the resistance of spring 20 to further compression.

Commencing from a position of control neutral, any movement of the pilot control wheel 40 will be transmitted through the mechanism to cause a corresponding movement of the aerofoil 50 up to a point where the air pressure reaction which develops against the aerofoil reaches a predetermined maximum safe amount. Further movement of the control wheel 40 results in the application of forces to the ends of the unit 10 that are in excess of the resistance provided by the spring 20. Such excess movement therefore further compresses the spring 20 and is absorbed by relative telescopic movement of the tubes 11 and 26, the inner end portion of tube 26 moving within the socket 18. The excess control movement is thus prevented from being transmitted to the connected aerofoil.

Likewise, any variations in air pressure against the connected aerofoil, for example as may be the result of purposeful changes in air speed, or of sudden shifting wind movements, are compensated for by the mechanism to automatically limit the maneuver to proper bounds and to avoid the imposition of dangerous loads upon the aircraft structure.

While the drawing illustrates a mechanism for operating a movable aerofoil of the elevator or aileron type, it is obvious that the same mechanism, with the possible addition of minor conventional connecting means, will operate with equal facility in connection with any type of movable surface for flight control purposes.

The magnitude of the force exerted by the spring 20 can be varied by shifting the positions of the bushing 12 and the collar 28 in relation to the tube 11 and the tube 26 respectively, to meet the various requirements of safety and flight characteristics of different aircraft. Although a pair of bolts 15 have been shown as being inserted in corresponding openings through the bushing 12 and the tube 11, it is apparent that only one bolt need be used for the purpose of maintaining these parts in any predetermined fixed relative position and that the openings herein shown may be realigned so that the right hand opening through the bushing 12 will register with the left hand openings in the tube 11 to receive a bolt therethrough in order to impose upon the spring 20 a greater degree of pre-loading. A corresponding change in the position of bolt 29 would, of course, also be made to provide equivalent spacings between the spring seat positioning elements of the unit.

It will be understood further that the apparatus and system described and shown herein is merely illustrative of the inventive principles involved, which may be applied to other physical embodiments without departing from the scope and spirit of the invention claimed.

I claim:

1. In an aircraft control motion transmitting device, in combination, a control flap, a pilot-operable control member, a motion transmitting mechanism interconnected with said pilot operable member and said flap to procure movement of said control flap in response to movements of said pilot operable member, said motion transmitting mechanism including a limited force transmitting unit for absorbing control movements in either direction of motion when opposed by air pressure forces upon said control flap which are in excess of a predetermined magnitude, said limiting force transmitting unit comprising a pair of opposed telescopic tubes and a partially compressed coil spring disposed therebetween and a pair of spaced annular bearing members mounted in slide fitting relation between said tubes and serving to maintain said tubes in spaced axial alignment and providing opposed seats for receiving in abutting relation the opposite ends of said coil spring, and means on said tubes for limiting movements of said bearing members relative to said tubes to procure axial compression of said spring upon relative movement of said tubes in either direction of axial movement and to maintain the unit in assembled relation.

2. In an airplane control motion transmitting device, a tubular member having a hollow plug secured in one end portion thereof, means for connecting said plug to an airplane control flap, a second tubular member movable longitudinally in the first tubular member and in said hollow plug, a collar slidable on the inner end portion of said second tubular member and normally engaging the inner end of said plug in abutting relation, a stop on the inner end portion of said second tubular member to prevent the collar from sliding therefrom, an abutment on said second tubular member at a location spaced from the inner end of the latter, a second collar slidable on the second tubular member and normally abutting said abutment, a partially compressed spring disposed between said collars and surrounding said second tubular member, stop means to prevent the second collar from moving out of the first tubular member, and means for connecting said second tubular member to a pilot operable control device.

3. In a naircraft control motion transmitting device, a tubular member having an inturned flange at one end, a collar slidable into and within said tubular member and adapted to bear against said inturned flange in abutting relation, a coil spring slidable into and within said tubular member and adapted to bear at one of its ends against said collar in abutting relation, a second collar similar to the first mentioned collar and disposed adjacent the other end of said spring, a second tubular member adapted to be slidably inserted through the open end of said first mentioned tubular member and through said collars and said spring and beyond the flanged end of said first mentioned tube to a point of connection with an airplane control element, said second mentioned tube having an outturned flange at its inner end which is adapted to bear against said second mentioned collar in abutting relation, a sleeve adapted to be slide-fitted through the open end of said first mentioned tubular member and with one of its ends in abutting relation with said second mentioned collar without interfering with the outturned flange of said second mentioned tube, means for adjustably fixing said sleeve in predetermined longitudinal relation with respect to the inturned flange of said first mentioned tubular member to limit the maximum spaced relation of said collars in a predetermined manner, and an abutting element mounted upon said second mentioned tubular member in spaced relation with respect to the outturned flange of said second mentioned tubular member to cooperate in limiting the maximum spaced relation of said collars, and means for operatively connecting said first mentioned tubular member to a second aircraft control element.

4. In an aircraft control motion transmitting device, a push-pull member of tubular form provided with an integral inturned flange at one end and being open at its other end, a second push-pull member having an integral outwardly extending shoulder portion formed on one of its ends and adapted to be inserted through the open end of said tubular member and arranged in telescopic relation therein with said outwardly extending flange in opposed and spaced relation with respect to said inturned flange, spring means interposed between opposed faces of said flange and said shoulder and maintained under pressure therebetween, and stop means disposed interiorly of said tubular member and exteriorly of said second mentioned push-pull member and abutting opposed ends of said spring means to cooperate with said flange and said shoulder to maintain said spring means under pressure, said stop means being in each case connected to said tubular member and said second mentioned push-pull member by connection means extending exteriorly of the device.

5. In an aircraft control motion transmitting device, a push-pull member adapted to be operably connected to one end of a control mechanism and provided with an integral laterally extending shoulder, a second push-pull member adapted to be operably connected to an opposite end of said control mechanism and having a portion disposed adjacent a portion of said first mentioned push-pull member, an integral laterally extending shoulder on said second mentioned push-pull member and opposing said first mentioned shoulder of said first mentioned push-pull member in spaced relation therewith, spring means interposed between said opposed shoulders and resiliently supporting the same apart during relative movement of said push-pull members to one side of a normal or neutral position of rest, a third shoulder extending laterally from said first mentioned push-pull member, and a fourth shoulder extending laterally from said second mentioned push-pull member in opposed spaced relation with respect to said third mentioned shoulder, said third and said fourth mentioned shoulders being arranged to bear against opposed ends of said spring means whereby said spring means resiliently support said third and said fourth mentioned shoulders against relative movement of said push-pull members to the opposite side of a normal or neutral position.

6. An aircraft control motion transmitting device including a pair of adjacent force transmitting members, one of said members movable relative to the other in opposed directions, guide means operably associated with said members and determining the relative path of said motion, each of said members having a pair of spaced opposed abutments, and an elastic body normally bearing against all of said abutments in elastically deformed condition and elastically resisting relative movement of said members in said path in either direction.

7. An aircraft control motion transmitting device including a pair of adjacent push-pull force transmitting members relatively movable in substantially parallel paths in opposed directions, means maintaining said members in adjacent relations, each of said members having a pair of spaced opposed abutments, and an elastic body normally bearing against all of said abutments in elastically deformed condition and elastically resisting relative movement of said members.

8. An aircraft control motion transmitting device including a pair of concentric push-pull force transmitting members relatively movable axially in either direction, means maintaining said members in concentric relation, each of said members having a pair of axially spaced opposed abutments, and an elastic body normally bearing against all of said abutments in elastically deformed condition and elastically resisting relative axial movement of said members.

9. An aircraft control surface control motion transmitting device including a pair of adjacent push-pull force transmitting members relatively movable in substantially parallel paths in opposed directions, means maintaining said members in adjacent relations, each of said members having a pair of spaced opposed abutments, and an elastic body normally bearing against all of said abutments in elastically deformed condition and elastically resisting relative motion of said members in either direction.

10. An aircraft control surface control motion transmitting device including a pair of concentric push-pull force transmitting members relatively movable axially in either direction, means maintaining said members in concentric relation, each of said members having a pair of axially spaced opposed abutments, and an elastic body normally bearing against all of said abutments in elastically deformed condition and elastically resisting relative axial motion of said members in either direction.

11. An aircraft control surface control motion transmitting device including a pair of concentric push-pull force transmitting members relatively movable axially in either direction, means maintaining said members in concentric relation, each of said members having a pair of axially spaced opposed abutments, and an elastic body normally bearing against all of said abutments in compressed condition and elastically resisting relative axial motion of said members in either direction.

12. An aircraft control surface control motion transmitting device including a pair of concentric tubular push-pull force transmitting members relatively movable axially in either direction, means maintaining said members in concentric relation, each of said members having a pair of axially spaced opposed abutments, and an elastic body normally bearing against all of said abutments in compressed condition and elastically resisting relative axial motion of said members in either direction.

13. An aircraft control motion transmitting device including a pair of concentric tubular push-pull force transmitting members relatively movable axially in either direction, means maintaining said members in concentric relation, each of said members having a pair of axially spaced opposed abutments, and a coil spring normally bearing against all of said abutments in elastically deformed condition and elastically resisting relative axial motion of said members in either direction.

14. An aircraft control surface control motion transmitting device including a pair of concentric push-pull force transmitting members relatively movable axially in either direction, each of said members having a pair of axially spaced opposed abutments, a pair of annular spacers slidably disposed between said tubular members and maintaining the latter in concentric relation, each of said spacers bearing against one of said abutments of each member, and a normally partially compressed spring arranged concentrically of said tubular members and bearing at its opposite ends against said spacers and normally maintaining the latter in bearing contact against their respective adjacent abutments, said spring being further compressible in response to relative axial motion of said tubular members in either direction of movement.

JOSEPH M. GWINN, Jr.